(12) United States Patent
Kutalek et al.

(10) Patent No.: US 10,218,161 B2
(45) Date of Patent: Feb. 26, 2019

(54) INTEGRATED COMPACT BUSHING STRUCTURE COMBINING THE FUNCTIONALITY OF PRIMARY CONTACT WITH A CURRENT TRANSFORMER PRIMARY CONDUCTOR AND A POST INSULATOR

(71) Applicant: ABB Technology AG, Zurich (CH)

(72) Inventors: Zdenek Kutalek, Brno-Kohoutovice (CZ); Stefano Motta, Besana Brianza (IT); Amar G. Kini, Lake Mary, FL (US); Frantisek Koudelka, Modrice (CZ)

(73) Assignee: ABB Schweiz AG, Baden (CH)

( * ) Notice: Subject to any disclaimer, the term of this patent is extended or adjusted under 35 U.S.C. 154(b) by 493 days.

(21) Appl. No.: 14/188,996

(22) Filed: Feb. 25, 2014

(65) Prior Publication Data

US 2015/0244156 A1    Aug. 27, 2015

(51) Int. Cl.
*H02G 3/08* (2006.01)
*H01F 41/00* (2006.01)
(Continued)

(52) U.S. Cl.
CPC ............ *H02G 3/083* (2013.01); *H01F 41/00* (2013.01); *H02B 11/04* (2013.01); *H02G 15/02* (2013.01);
(Continued)

(58) Field of Classification Search
CPC .... H02B 11/04; H02B 13/0356; H02G 15/02; H02G 3/083; H01H 33/6606; H01H 33/025
(Continued)

(56) References Cited

U.S. PATENT DOCUMENTS 4,477,692 A * 10/1984 Brealey ................. H01B 17/42
174/142
5,929,410 A * 7/1999 Mun ........................ H01H 1/62
200/258
(Continued)

FOREIGN PATENT DOCUMENTS

CN          20233561 U     7/2012
DE          3639626 A1     6/1988
(Continued)

OTHER PUBLICATIONS

Internatioanl Search Report & Written Opinion in PCT/US2015/015098 dated Jul. 15, 2015.

*Primary Examiner* — Timothy J Thompson
*Assistant Examiner* — Rhadames Alonzo Miller
(74) *Attorney, Agent, or Firm* — J. Bruce Schelkopf; Taft Stettinius & Hollister LLP

(57) ABSTRACT

A bushing structure for a switchgear includes a mounting portion constructed and arranged to mount the bushing structure. A barrel portion extends from the mounting portion and is coaxial there-with. The barrel portion includes a plurality of undulations in a peripheral surface thereof to increase creepage distance. A primary contact is disposed within and extends a length of the barrel portion. The primary contact has a first end constructed and arranged to be contacted by a movable contact of the switchgear and a second end constructed and arranged to be connected with a busbar.

9 Claims, 3 Drawing Sheets

(51) Int. Cl.
*H02B 11/04* (2006.01)
*H02B 11/28* (2006.01)
*H02G 15/02* (2006.01)
*H02B 13/035* (2006.01)

(52) U.S. Cl.
CPC .......... *H02B 11/28* (2013.01); *H02B 13/0356* (2013.01); *Y10T 29/4902* (2015.01)

(58) Field of Classification Search
USPC .................. 174/142, 668; 361/611; 29/602.1
See application file for complete search history.

(56) References Cited

U.S. PATENT DOCUMENTS

| | | | | |
|---|---|---|---|---|
| 6,346,677 | B1* | 2/2002 | Guillemette | H01B 17/26 |
| | | | | 174/142 |
| 6,747,207 | B2* | 6/2004 | Alfonsi | H02B 13/065 |
| | | | | 16/2.1 |
| 2007/0145015 | A1* | 6/2007 | Fink | H01H 31/003 |
| | | | | 218/118 |
| 2008/0207022 | A1* | 8/2008 | Hughes | H01R 13/53 |
| | | | | 439/89 |
| 2011/0256746 | A1* | 10/2011 | Borgstrom | H01R 13/53 |
| | | | | 439/181 |
| 2011/0299228 | A1* | 12/2011 | Milovac | H02B 11/26 |
| | | | | 361/614 |
| 2012/0297798 | A1* | 11/2012 | Kaufmann | H01H 9/52 |
| | | | | 62/62 |
| 2013/0186683 | A1* | 7/2013 | Xu | H01B 17/42 |
| | | | | 174/650 |
| 2013/0199837 | A1* | 8/2013 | Xu | H01B 17/42 |
| | | | | 174/650 |

FOREIGN PATENT DOCUMENTS

| | | |
|---|---|---|
| DE | 29508111 U1 | 8/1995 |
| GB | 2338600 A | 12/1999 |
| JP | 58080718 U * | 6/1983 |
| WO | 2012161930 A1 | 11/2012 |

\* cited by examiner

INTEGRATED COMPACT BUSHING STRUCTURE COMBINING THE FUNCTIONALITY OF PRIMARY CONTACT WITH A CURRENT TRANSFORMER PRIMARY CONDUCTOR AND A POST INSULATOR

FIELD

The invention relates to medium voltage air insulated switchgears and, more particularly, to a bushing structure that combines the functionality of primary contact with a current transformer primary conductor and a post insulator.

BACKGROUND

With reference to FIG. 1, an example of a conventional medium voltage switchgear is shown generally at 10. As used herein, the terms "medium voltage switchgear" refers to switchgear rated for operation up to and including 15 kV. In general, switchgear 10 comprises an enclosure, such as metal-clad enclosure 12, for housing the switchgear components. Enclosure 12 may contain one or more separate compartments, such as circuit breaker compartment 14, main bus compartment 16, and cable compartment 18. The bus and cable compartments can be formed as a single compartment. Switchgear 10 contains one or more circuit breakers, generally indicated at 20. In the embodiment shown, circuit breaker 20 is a three-pole drawout type circuit breaker. Circuit breaker 20 is connected to primary contacts that are supported by primary conductor bushings 22 that are connected to current-carrying bus bars 24.

In this typical switchgear arrangement, the current transformers 26 are mounted in the circuit breaker compartment 14 while the primary contact are carried by the bushing 22 located in a separate bus and cable compartments 16, 18. This configuration increases design and assembly complexity. At higher current ranges, the length of a bushing 22 associated with a primary contact must be increased to maintain sufficient creepage distance, adding to the overall switchgear depth.

Thus, there is a need to provide a bushing structure that combines the functionality of a primary contact with a current transformer primary conductor and a post insulator to reduce the depth and width of the switchgear.

SUMMARY

An objective of the invention is to fulfill the need referred to above. In accordance with the principles of the present invention, this objective is obtained by providing a bushing structure for a switchgear. The bushing structure includes a mounting portion constructed and arranged to mount the bushing structure. A barrel portion extends from the mounting portion and is coaxial there-with. The barrel portion includes a plurality of undulations in a peripheral surface thereof to increase creepage distance. A primary contact is disposed within and extends a length of the barrel portion. The primary contact has a first end constructed and arranged to be contacted by a movable contact of the switchgear and a second end constructed and arranged to be connected with a busbar.

In accordance with another aspect of the disclosed embodiment, a method provides a bushing structure in a switchgear. The method provides a wall in a housing of the switchgear so that the wall separates a circuit breaker compartment from a bus/cable compartment. At least one bushing structure is mounted with respect to the wall so that the bushing structure extends through the wall, with a first portion of each bushing structure being disposed in the circuit breaker compartment and a second portion of the bushing structure being disposed in the bus/cable compartment. A barrel portion extends from the second portion and a primary contact is disposed within and extends a length of the barrel portion. The primary contact has a first end constructed and arranged to be contacted by a movable contact of the switchgear and a second end connected with a busbar. At least one current transformer is mounted on the barrel portion enabling a depth and a width of the switchgear to be reduced.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 2:
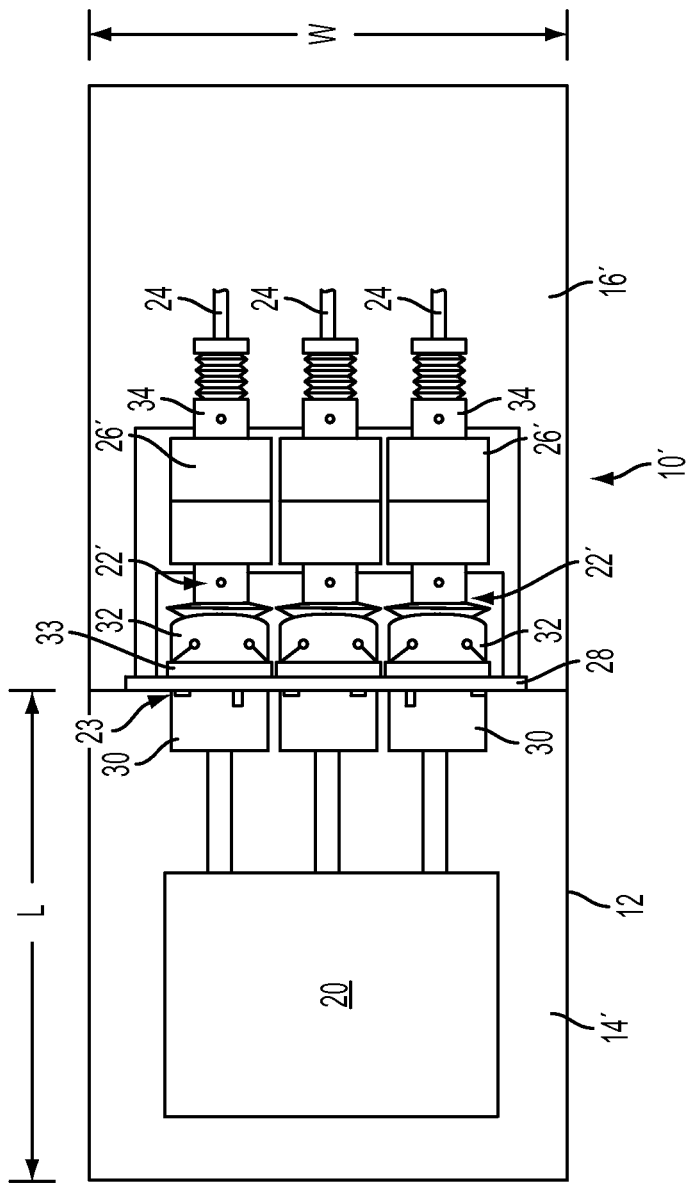
FIG. 2 is top view of current transformers mounted on bushing structures in a bus/cable compartment of a switchgear in accordance with an embodiment.

With reference to FIG. 2, an air insulated switchgear 10' includes a housing 12 having a wall 28 separating a circuit breaker compartment 14' from a bus/cable compartment 16'. As used herein, bus/cable compartment 16' can include a main bus compartment only or a combined main bus compartment 16' and cable compartment 18'. In accordance with an embodiment, a plurality of primary conductor bushing structures 22' is provided. Each bushing structure 22' includes a mounting portion, generally indicated at 23, for mounting the bushing structure 22' to the wall 28 so that so that a cylindrical first portion 30 of the mounting portion 23 extends through the wall 28 and is disposed in the circuit breaker compartment 14' together with the circuit breaker 20, electrically coupled therewith. As shown, three bushing structures 22' are provided for a three-phase switchgear 10'. A cylindrical second portion 32 of the mounting portion 23 of each bushing structure 22' is disposed in the bus/cable compartment 16' and is coaxial (see axis A in FIG. 4) with first portion 30. A flange 33 of the mounting portion 23 separates the cylindrical portions 30, 32 and is used to mount the bushing structure 22' to the wall 28.

One or more compact current transformers 26' is mounted concentrically on a cylindrical barrel portion 34 that extends from the second portion 32 of the mounting portion 23 of each bushing structure 22'. Thus, the barrel portion 22' is coaxial with the mounting portion 23 (see axis A in FIG. 4). The outer diameter of the mounting portion 23 is greater than an outer diameter of the barrel portion 34.

Figure 3:
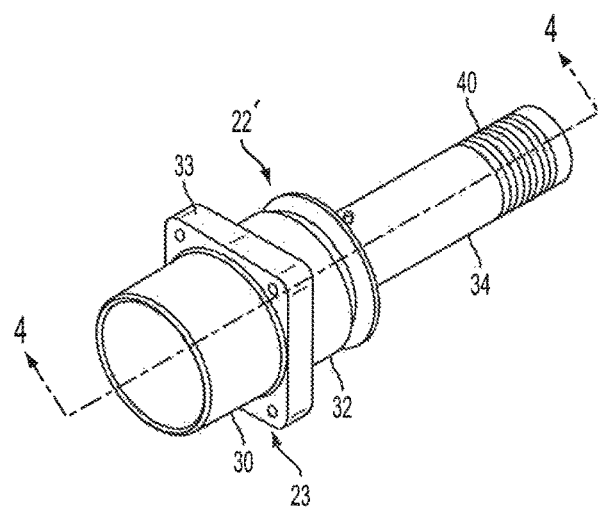
FIG. 3 is perspective view of a bushing structure of FIG. 2.
Figure 4:
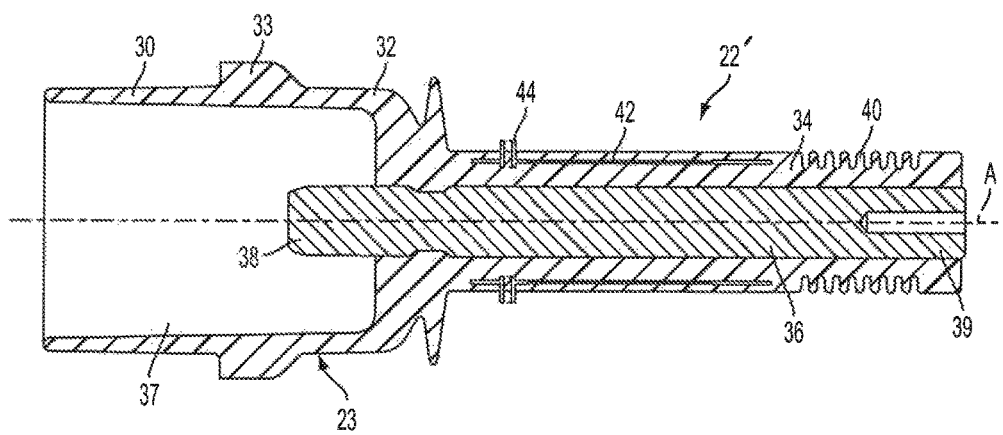
FIG. 4 is an enlarged sectional view of the bushing structure taken along the line 4-4 of FIG. 3.

With reference to FIGS. 3 and 4, each bushing structure 22' is preferably molded or cast. Each bushing structure 22' includes a generally cylindrical primary contact 36 disposed within and extending the length of the barrel portion 34 so that an end 38 of the contact 36 extends into a hollow interior 37 of the mounting portion 23 for contacting with the movable contact (not shown). An opposing end 39 of each primary contact 36 is constructed and arranged to be connected with a bus bar 24 (FIG. 2). Ribs or undulations 40 are added to a periphery of the barrel portion 34 near an end thereof to increase creepage distance and thereby reduce a length of the bushing structure 22'. In additional, a metallic shield 42 is integrated or embedded in the barrel portion 34 to allow optimization of the electric field as well as barrel diameter and subsequently allow for reducing the size of the current transformers used. The metallic shield 42 is provided with multiple accessible connection portions 44 for connection with ground potential. Using this dielectric shield 42 reduces partial discharges, increasing reliability of the switchgear 10'.

As shown in FIG. 2, each bushing structure 22' is configured to carry one or more current transformers 26' concentrically mounted over the barrel portion 34. The same bushing structure 22' can be used for different current ranges, by changing only the current transformer 26'. Thus, each bushing structure 22' combines the functionality of primary contact with current transformer primary conductor and a post insulator.

Figure 1:
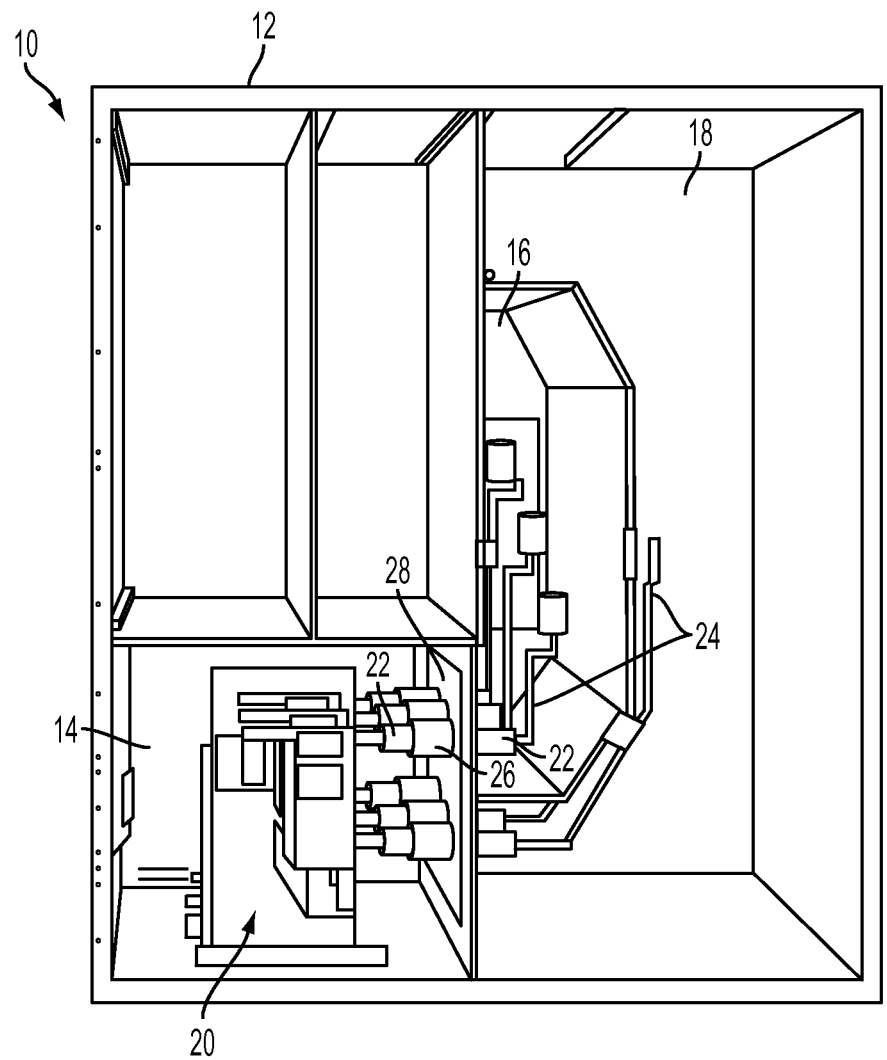
FIG. 1 is a side view of a conventional medium voltage switchgear, shown with a side panel removed to illustrate internal components.

The integrated bushing structure 22' increases reliability while reducing the depth and width of the switchgear 10'. As shown in FIG. 2, the configuration reduces the length L and the width W of the circuit breaker compartment 14' and thus decreases the overall dimensions of the switchgear 10', as compared to the conventional switchgear 10 of FIG. 1. Such space savings is achieved by moving current transformers 26' to the bus/cable compartment 16' so as to be on the bushing structures 22'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A bushing structure for a switchgear comprising:
   a mounting portion constructed and arranged to mount the bushing structure, the mounting portion comprising a flange adapted to be mounted to a switchgear wall,
   a barrel portion extending from the mounting portion and coaxial there-with, the barrel portion including a plurality of undulations in a peripheral surface thereof to increase creepage distance, and
   a single, unitary primary contact disposed within and extending an entire length of the barrel portion, the primary contact having a first end constructed and arranged to be contacted by a movable contact of the switchgear and a second end constructed and arranged to be connected with a separate busbar, and
   a metallic shield embedded in the barrel portion,
   wherein the metallic shield includes connection portions connected with the embedded metallic shield, with each connection portion having a portion extending through a wall of the barrel portion and outward through an outer periphery of the wall so as to be exposed and accessible immediately adjacent to the outer periphery of the wall of the barrel portion and spaced from the flange, the exposed portions of the connection portions being constructed and arranged to be connected with ground potential.

2. The bushing structure of claim 1, wherein the mounting portion comprises:
   a first portion,
   a second portion coaxial with the first portion, the barrel portion extending from the second portion, and
   the flange separating the first and second portions and constructed and arranged to mount the bushing structure.

3. The bushing structure of claim 2, wherein each of the first portion, the second portion and the barrel portion is generally cylindrical.

4. The bushing structure of claim 3, wherein the first end extends into a hollow interior of the mounting portion.

5. The bushing structure of claim 1, wherein each of the barrel portion and the primary contact are generally cylindrical.

6. The bushing structure of claim 5, wherein an outer diameter of the mounting portion is greater than an outer diameter of the barrel portion.

7. The bushing structure of claim 1, in combination with at least one current transformer mounted on the barrel portion.

8. The combination of claim 7, wherein the at least one current transformer is mounted concentrically on the barrel portion.

9. The combination of claim 7, further comprising a busbar coupled to the second end of the primary contact.

* * * * *